Oct. 28, 1969   W. HOVERMAN, JR   3,474,586
SEALING STRIP
Filed June 30, 1967   2 Sheets-Sheet 1

INVENTOR.
WILLIAM HOVERMAN, JR.
BY
*Jmmilliken*
ATTORNEY

Oct. 28, 1969  W. HOVERMAN, JR  3,474,586
SEALING STRIP

Filed June 30, 1967  2 Sheets-Sheet 2

INVENTOR.
WILLIAM HOVERMAN, JR
BY
ATTORNEY

United States Patent Office 3,474,586
Patented Oct. 28, 1969

3,474,586
SEALING STRIP
William Hoverman, Jr., Wapakoneta, Ohio, assignor to The Goodyear Tire & Rubber Company, Akron, Ohio
Continuation-in-part of application Ser. No. 485,255, Sept. 7, 1965. This application June 30, 1967, Ser. No. 650,504
The portion of the term of the patent subsequent to Aug. 29, 1984, has been disclaimed
Int. Cl. E06b 7/23; B60j 1/02
U.S. Cl. 52—400                    2 Claims

ABSTRACT OF THE DISCLOSURE

A sealing strip of elastomeric material for mounting windows and windshields in automotive vehicles, the strip has a windowpane receiving channel which expands to compensate for variations in glass tolerance while snugly fitting against the windowpane to create a leak-proof seal around the edges without the use of conventional putty-like caulking compounds in the windowpane receiving channel.

CROSS-REFERENCE TO RELATED APPLICATION

This is a continuation-in-part of my copending application, Ser. No. 485,255, now Patent No. 3,338,015 filed Sept. 7, 1965.

PRIOR ART

The most pertinent prior art known to the applicant are Patents No. 2,497,276 issued to E. D. Scott et al., 3,037,810 issued to O. K. Kelley, 3,061,895 issued to H. F. Kleinhans and 3,230,677 issued to H. R. Brown.

In the past when mounting automotive windshields in the rubber seal strips which hold them in the window frame, it has been necessary, as shown in Patent No. 3,037,810, to supplement the sealing action of the seal strip by coating the inside surfaces of the channels which receive the windowpane and the window frame with a putty-like caulking compound sometimes referred to as "gunk." This sealing method has not been satisfactory, particularly in the windowpane channel, since it is messy to apply and over a period of time seeps out and smears the windows. Sometimes this compound collects grit which is picked up by the windshield wipers and causes small scratches in the windshield. The use of such sealant compounds in the window frame receiving channel does not pose the same problems as when used in the windowpane receiving channel since it will not cause smearing of the windshield unless used in the windowpane channel. It is, therefore, sometimes desirable to eliminate the use of sealant in the windowpane channel but to continue use of it between the window frame and the seal strip.

Other of the previously used sealing strips such as shown in Patent No. 2,497,276 have attempted to improve the seal by use of a plurality of integral sealing fins located in the channels which receive the glass or the windowpane. These have not been entirely satisfactory since only a limited portion of the channel is in sealing contact with the glass or window frame which is inserted therein.

OBJECTS OF THE INVENTION

It is a primary object of this invention to eliminate the need for a putty-like sealing compound inside the windowpane receiving channel by providing a seal strip, the inherent design of which creates a leak-proof seal merely by the contact of the sealing strip with the windowpane.

Another object of the invention is to eliminate the need for sealing fins in the windowpane receiving channel of the seal strip.

Still another object of the invention is the provision of a seal strip which readily adjusts to the variations in tolerance of the windowpane and the window frame while maintaining a larger effective sealing area in contact with the windowpane at all times.

These and other objects of the invention will appear more fully in the following specifications and the accompanying drawings.

DESCRIPTION OF THE PREFERRED EMBODIMENTS

Figure 1:
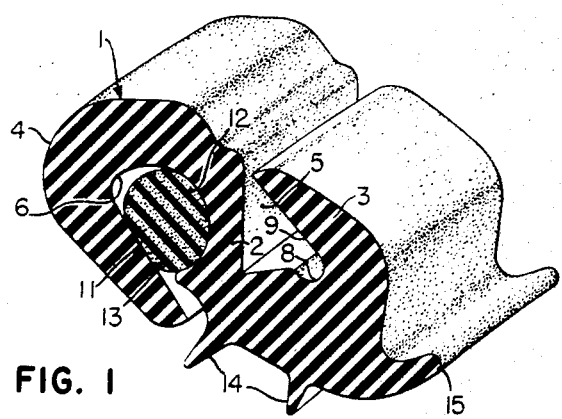
FIG. 1 is a cross-sectional view in perspective of a sealing strip in its normal unstressed shape prior to assembly with a windshield mounted in a vehicle window opening.
Figure 2:
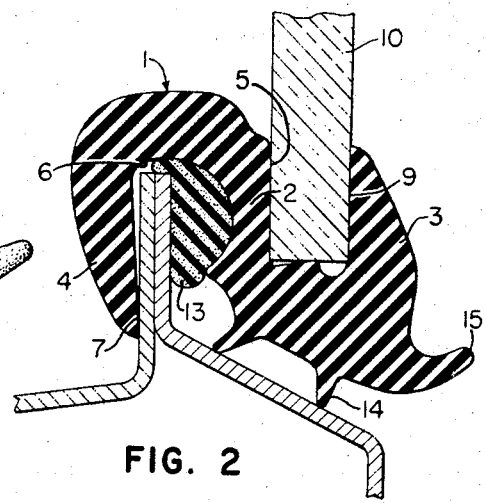
FIG. 2 shows a section of the seal strip of FIG. 1 after assembly and connecting the marginal edges of a pane of glass to the marginal edge of a sheet metal support such as a window opening in an automotive vehicle.

Referring now more specifically to the drawings, and in particular to FIGS. 1 and 2, the numeral 1 indicates generally the sealing strip or body portion of the invention. For the purpose of illustrating the invention a windshield is shown mounted in the seal strip; however, rear decks or other windows or panels may also use the seal strip. The cross section of the sealing strip 1 is of irregular contour and resembles a modified "S" curve. The seal strip 1 is preferably an extrusion of resilient elastomeric material such as rubber or the like. It may, however, be molded, cast or made by any other manufacturing method. The seal strip 1 has a continuous longitudinal intermediate portion 2 which has an integral lip 3 extending from one side thereof and a similar lip 4 extending from the opposite side thereof. The lip 3 is spaced from the intermediate portion 2 and defines a glass receiving channel 5 therebetween. The lip 4 is spaced from the intermediate portion 2 and defines a channel 6 therebetween which receives a window frame 7 (shown in FIG. 2) of a vehicle window opening. The window frame 7 is of the typical pinch weld construction used on many vehicle bodies. It consists of a welded metal flange which forms a portion of a vehicle body. Both the channels 5 and 6 are substantially closed at their outer extremities when the seal strip 1 is in its normal unstressed extruded form prior to assembly, and the glass receiving channel 5 is narrower than the thickness of the glass to be placed therein. The width of the channels 5 and 6 depends upon the thickness of the part which is fit into them since the channels adjust to fit the part.

A continuous longitudinal breaker groove 8 is located along the base of the channel 5 at the junction with lip 3 to provide greater flexibility to the lip 3 at said channel base and thereby facilitate opening the lip 3 to receive a windowpane without substantial bending of the lip 3, thereby providing greater surface contact between the flat inner face 9 of the lip 3 and a windowpane 10 of glass or other sheet material that is inserted therein. The breaker groove 8 permits the channel 5 which, before insertion of the glass, is narrower than the thickness of the glass 10 to open wider to receive the glass and provide a snug fit therewith. To further increase the surface contact between the inner face 9 and the window pane 10, the lip 3 is thickest at the base portion and tapers to a thinner cross section at its outer extremity so that even when the outer extremity of the lip is pulled away from the windowpane 10 the base portion of the lip 3, because of its thickness, will still remain in sealing contact therewith.

The inner surface 11 of the lip 4 is substantially flat and is opposite a curved surface 12 on the intermediate portion 2. This results in the channel 6 having a curved side and a flat side. A continuous strip 13 of resilient cellular material such as butyl sponge, ethylene propylene, terpolymer, urethane foam neoprene or other suitable material is adhered to the curved surface 12 of the channel 6 by any suitable adhesive. The strip 13 should be made of moisture proof material which is more resilient than the sealing strip 1 yet of sufficient stiffness to exert pressure against a panel member or window frame inserted in the channel 6 between the strip 13 and the lip 4, and provide a leakproof seal between the seal strip 1 and the frame 7. In some seal strip assemblies, the strip 13 may be hollow to provide greater resiliency. When assembled the edge of the windowpane 10 lies outwardly from the edge of the window frame 7. The resiliency of the strip 13 and the deflection of the intermediate portion 2 compensates for variations in tolerance of the spacing between the window frame 7 and the windowpane 10 to provide a continuous seal along the entire length of the seal strip 1. The seal strip 1 in the embodiment shown in FIGS. 1, 2 and 3 has a pair of tapered fins 14 along its lower surface, and a forwardly extending curved fin 15 along the front thereof. The fins 14 are used on the seal strip 1 when additional thickness is required in the seal strip wall at the base of window channel 9 to make proper surface contact with certain designs of window frames and to compensate for irregularities and variations of the window and frame. When the seal strip is used with some window frames, the fins 14 are not needed.

On some seal strips it is useful to have a curved fin such as the fin 15 to break up the air flow across the seal strip and reduce wind noise. Such a fin is not needed on all seal strips but is more useful on a seal strip which is used to mount the front windshield in a vehicle window frame where there is exposure to high wind velocities.

Referring now to FIG. 2, it will be seen that when the windowpane 10 is inserted in the channel 5 the lip 3 is bent outward from its normally closed position. With the windowpane inserted in the channel 5 the lip 3 applies constant pressure against the windowpane 10 thereby gripping it between the lip 3 and the intermediate portion 2 with the inner face 9 of the lip 3 lying flat against the edge of the windowpane 10 to form a leakproof seal between the windowpane 10 and the seal strip 1. Similarly, when the seal strip 1 is placed on the window frame 7, the lip 4 is bent outwardly from its normally closed position and then allowed to close against one surface of the window frame 7 to sealingly grip the frame 7 between the lip 4 and the butyl sponge strip 13.

It will be seen that since both the channels 5 and 6 must be flexed from their normally substantially closed position to receive the parts inserted therein, a built-in tension is created which continually holds both the windowpane channel lip 3 and the window frame channel lip 4 tightly against the objects inserted therein. The breaker groove 8 in conjunction with the tapered design of the lip 3 provides a cross sectional design which is sufficiently flexible to adjust to different glass tolerances and yet maintain the inner face of the lip 3 in flat sealing contact with the glass. The seal created in this manner makes it unnecessary to coat the inner surface of the windowpane receiving channel with a putty-like sealing compound which has usually been necessary in the past.

Figure 3:
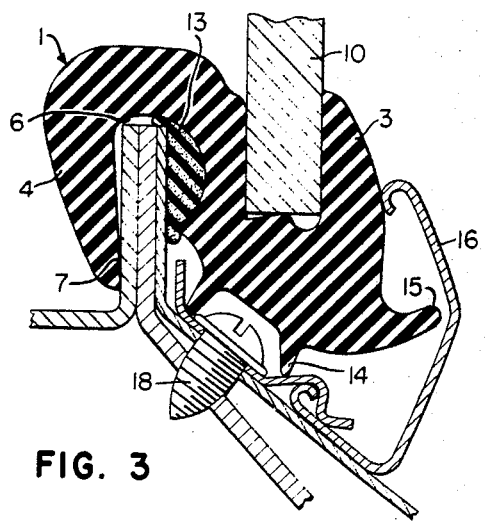
FIG. 3 is similar to FIG. 2 but shows a trim strip installed on the outside of the seal strip.

In FIG. 3 the seal strip 1 is the same as that shown in FIG. 2 except that a chrome trip strip 16 is positioned over the front of the seal strip 1 and is fastened to an automobile body by a spring clip 17 held in place by a screw 18.

Figure 4:
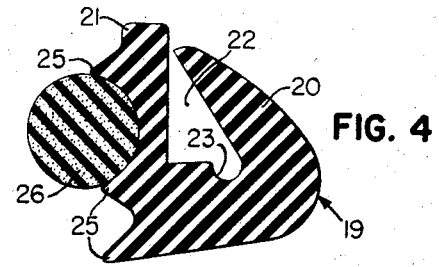
FIG. 4 shows a cross section of another embodiment of the seal strip in its normal unstressed position.

Another embodiment of this invention is shown in FIG. 4 in which an elastomeric seal strip 19 is of a substantially U-shape configuration and has a tapered outer lip 20 and an irregular shaped intermediate portion 21 defining therebetween a windowpane receiving channel 22 which, before the insertion of the windowpane, is narrower than the glass thickness. When the seal strip 19 is mounted in a window frame with a windowpane, the intermediate portion 21 lies between the pane of glass and the window frame. The channel 22 has a continuous longitudinal breaker groove 23 along the base thereof similar to the breaker groove 8 in FIGS. 1 and 2. The breaker groove 23 provides flexibility for bending the lip 20 outwardly to receive a pane of glass 24 (FIG. 5) in the same manner that the breaker groove 8 provides flexibility for lip 3 in FIG. 1. The lip 20 is thickened at the base portion and tapers to a thinner cross section at its outer extremity. This configuration provides maximum surface contact between the lip 20 and the windowpane 24 to create a seal with the channel 22 in the same manner that the windowpane 10 is held by channel 5 in FIG. 2. The intermediate portion 21 has a plurality of rearwardly facing fins 25 between which is mounted a strip 26 of butyl sponge material.

Figure 5:
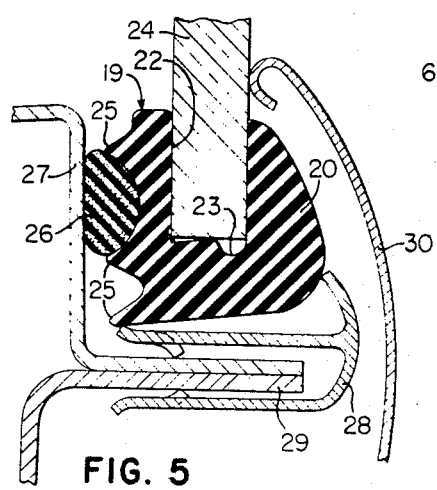
FIG. 5 shows the strip of FIG. 4 after assembly with a pane of glass in a window opening and with a trim strip mounted on the outside of the seal strip.

As shown in FIG. 5, the strip 26 is compressed between the seal strip 1 and a portion of a window frame 27 to provide a seal therebetween. In FIG. 5 the seal strip 19 is held in position against the window frame 27 by a series of spring clips 28 which attach to a pinch weld type flange 29 one part of which is integral with the window frame 27. When the seal strip 19 is fastened to the window frame 27, the strip 26 is compressed therebetween to provide a weatherseal without the use of additional sealing compound. This embodiment is used on window openings which eliminate a pinch weld in the area of contact with the seal strip. An outside chrome trim strip 30 is mounted on the outside of the seal strip 19 and is attached by suitable means (not shown) to the window frame.

Figure 6:
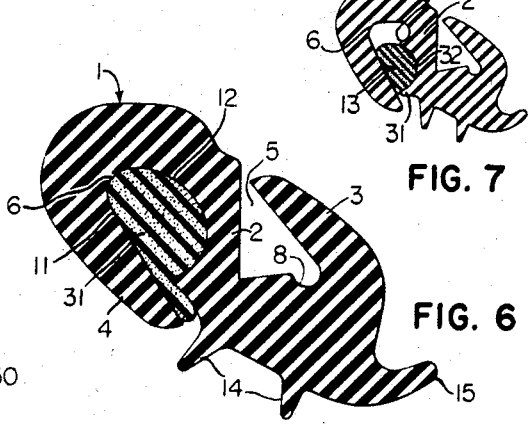
FIG. 6 shows a cross-section of another embodiment of the invention.

In FIG. 6 a pinch weld receiving channel 6 is filled with a continuous strip of cast-in-place resilient urethane foam 31 which serves the same sealing function as the butyl sponge strip 13 in FIGS. 1, 2 and 3. A pinch weld inserted into the channel 6 would be gripped between the inner face 11 of the lip 4 and the foam 31 in the same manner as the pinch weld frame 7 in FIGS. 2 and 3. The strip 31 may be adhered to the curved surface 12 of the channel 6 by any suitable adhesive or it may be held in place merely by the contour of the channel 6.

Figure 7:
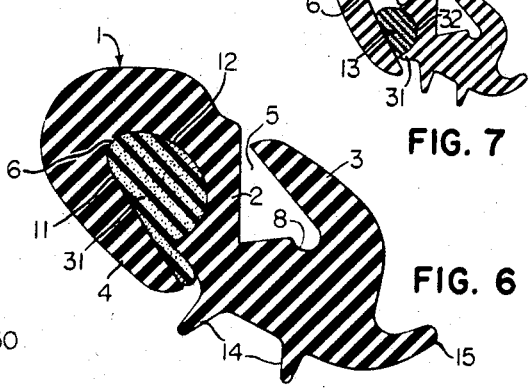
FIG. 7 shows a cross section of another embodiment of the invention.

The embodiment shown by the smaller scaled view in FIG. 7 is similar to that shown in FIGS. 1 through 3 except that the strip 13 is positioned lower in the window frame channel 6 to accommodate certain types of pinch welds. To locate the strip 13 at the desired position in the channel 6, a pair of longitudinal fins 31 extend rearwardly from the intermediate portion 2. The fins 31 are spaced apart to form an arcuate groove 32 therebetween into which the strip 13 is placed. The fins 31 aid in preventing the strip 13 from being forced out of sealing position by the pinch weld when the seal strip 1 is positioned thereon.

Figure 8:
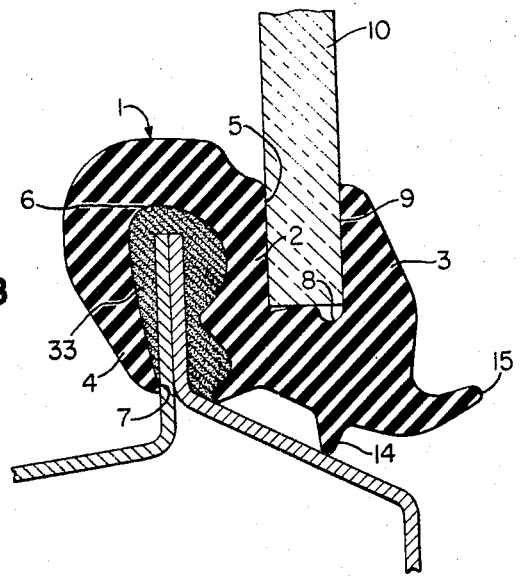
FIG. 8 is similar to FIG. 2 but with a modification in the seal between the seal strip and the window opening.
Figure 9:
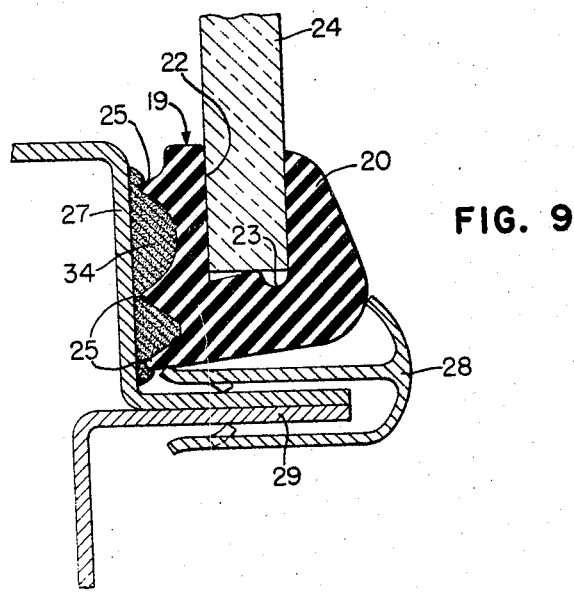
FIG. 9 is similar to FIG. 5 but with a modification in the seal between the seal strip and the window opening.

FIGS. 8 and 9 are substantially identical to FIGS. 2 and 5 respectively except for the manner of sealing between the seal strip and the window frame and for simplicity like numerals will be used to indicate like parts.

In FIG. 8 the cross sectional contour of the seal strip 1 is the same as that in FIG. 2 and in both embodiments the windowpane 10 is sealingly gripped in channel 5 in the same manner. In FIG. 8, however, the window frame 7 is sealed in channel 6 by a putty-like sealant 33 comprised of any one of many polymer compounds normally used for such purpose which substantially fills the channel 6 and surrounds the marginal edge of the window frame 7.

In FIG. 9 the windowpane 24 is sealingly gripped in the channel 22 in the same manner as in FIG. 5. The seal between the window frame 27 and the seal strip 19 is created by a layer of putty-like viscous sealing compound 34 therebetween similar to the sealant 33.

When certain contours of window frames are involved, it is sometimes desirable to use both a strip of sponge-like material such as that shown by the numerals 13 and 26 in combination with a putty-like sealant 33 or 34 to create a seal between the seal strip and the window frame.

In any of the embodiments shown in FIGS. 1 through 3, FIGS. 4 and 5, or FIGS. 8 and 9 the use of a tapered lip having a flat inner face in conjunction with a breaker groove such as 8 or 23 are some of the most significant features of the invention. This configuration provides maximum sealing surface contact of the seal strip with the glass pane and sufficient flexibility of the seal strip to adjust to variations in tolerance of the glass and window frame thickness and to variations in the spacing between the edges of the glass and the window frame.

Various changes may be made in the illustrative embodiments shown herein without departing from the scope of the invention.

What is claimed is:
1. A sealing strip having an elongated elastomeric body portion of uniform cross section for mounting a windowpane in a window frame comprising:
(A) an intermediate portion to be positioned between the windowpane and the window frame, said intermediate portion having a ribbed surface on the side facing the window frame and a substantially flat surface on the opposite side along the length thereof,
(B) at least one longitudinal integral outer lip extending therefrom with a substantial portion of the outer lip spaced from said intermediate portion and defining a windowpane receiving channel therebetween, the inner face of the lip being a flat surface located on the opposite side of the channel from the flat surface on the intermediate portion,
(C) a longitudinal breaker groove in the bottom of the channel at the junction of the lip and the intermediate portion to permit the lip to be opened easily to receive the edge of the windowpane with the inner face of the lip retaining a substantially flat contour to provide maximum sealing surface contact with the windowpane,
(D) said lip being thicker at the base portion adjacent the breaker groove and uniformly tapering to a thinner cross section at its outer extremity, thereby providing greater flexibility at the outer extremity than at the base so that if the outer extremity of the lip is pulled away from the windowpane in the channel, the base portion of the lip will still remain in sealing contact therewith,
(E) the breaker groove and the tapered configuration of the lip resiliently cooperating to provide width adjustment of the windowpane receiving channel while retaining both flat sides of the channel in intimate sealing contact with the windowpane inserted therein, and
(F) a layer of putty-like sealant compound located between the intermediate portion and the window frame to provide a leak-proof seal therebetween,
(G) the ribbed surface of the intermediate portion providing additional surface contact between the intermediate portion and the sealant compound and reducing the migration of sealant from between the sealing strip and the window frame.

2. The sealing strip of claim 1 including an integral longitudinal inner lip extending from the side of the intermediate portion opposite the outer lip and forming in conjunction with the intermediate portion, a window frame receiving channel, said channel being substantially filled with putty-like sealant which surrounds the marginal edge of the window frame to provide a leak-proof seal between the frame and the seal strip, with the ribs on the inner surface of the intermediate portion aiding the retention of sealant in the channel.

References Cited

UNITED STATES PATENTS

| 3,061,895 | 11/1962 | Kleinhans | 52—400 |
| 3,230,677 | 1/1966 | Brown | 52—208 |
| 3,338,015 | 8/1967 | Hoverman | 52—400 |
| 3,037,810 | 6/1962 | Kelley | 52—400 X |
| 2,497,276 | 2/1950 | Scott et al. | 52—400 X |

FOREIGN PATENTS

| 620,325 | 3/1949 | Great Britain. |

FRANK L. ABBOTT, Primary Examiner

SAM D. BURKE III, Assistant Examiner

U.S. Cl. X.R.

52—403